Nov. 2, 1965 R. M. GOODMAN 3,215,850

MINIATURE SHOCK-RESISTANT PHOTOCELL

Filed July 6, 1961 2 Sheets-Sheet 1

INVENTOR.
ROBERT M. GOODMAN

BY

Nelson E. Kimmelman
ATTORNEY

Nov. 2, 1965 R. M. GOODMAN 3,215,850

MINIATURE SHOCK-RESISTANT PHOTOCELL

Filed July 6, 1961 2 Sheets-Sheet 2

INVENTOR.
ROBERT M. GOODMAN
BY
Nelson E. Kimmelman
ATTORNEY

United States Patent Office 3,215,850

Patented Nov. 2, 1965

3,215,850
MINIATURE SHOCK-RESISTANT PHOTOCELL

Robert M. Goodman, 200 E. Township Line Road, Elkins Park, Pa.

Filed July 6, 1961, Ser. No. 122,136
12 Claims. (Cl. 250—239)

This invention relates to electronic apparatus and in particular to modular electrical components such as light-responsive cells or switches and relays of diverse configurations.

While light-responsive cells are known, they often are larger than desired, require sealing within a glass envelope or the like to keep out moisture or impurities and are vulnerable to damage by impact or other physical shocks. Similarly, a number of devices are known which perform switching actions or relay actions in response to light signals. They, too, are generally relatively bulky and not susceptible of easy modifications or variations in manufacture to adapt them for various applications. Furthermore, many of the latter prior art devices are not constructed to withstand considerable shocks and stresses.

It is therefore an object of the present invention to provide a novel miniature, shock-resistant, light-responsive cell.

Another object of this invention is to provide a novel, light-responsive switch or relay.

Another object of the present invention is to provide a novel, miniaturized light-responsive switch or relay.

A further object of the invention is to provide a novel miniaturized light-responsive device which does not require envelope sealing against moisture or impurities.

Still another object of the invention is to provide a miniature light-responsive switch or relay capable of simple modification or variation in manufacture to meet the requirements of many different possible applications.

Still another object of the invention is to provide an extremely versatile and compact light-responsive cell, switch, or relay built up from a number of modules thereby facilitating construction and permitting it to take numerous configurations.

Another aim of the invention is to provide a highly efficient miniature cell, switch or relay device which may be easily and economically produced in any of a number of possible forms.

Many other objects and uses of this invention will be apparent to workers in the art from inspection of the drawings, specification and claims herein.

In accordance with my invention I provide an electrical device made from a selected number of modular components, the number and type of said components depending upon the particular application desired. In a typical application the device includes an opaque housing, a substantially flat flexible plastic member transmissive of selected radiation and a photosensitive member close to said flexible member and having the same general configuration as the latter. The members or modules are designed to fit snugly within the housing, their transverse cross-sections and the cross-section of the interior of the housing being substantially congruous. In one form of the invention a light source is embedded in the flexible plastic member to control or switch the photosensitive member. Other forms of the invention are also possible, some of them being illustrated and explained herein.

Figure 2:
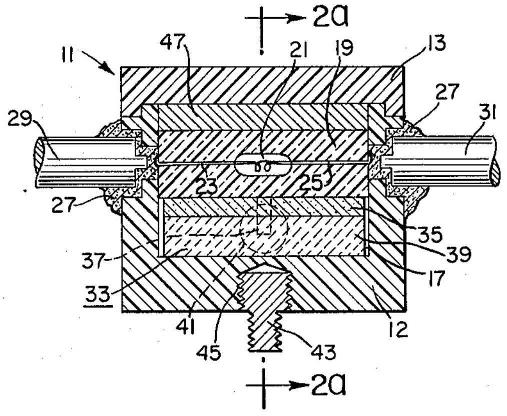
FIG. 2 is a partly sectional side elevation view of a novel light-responsive switch or relay constructed in accordance with another form of my invention.
Figure 2A:
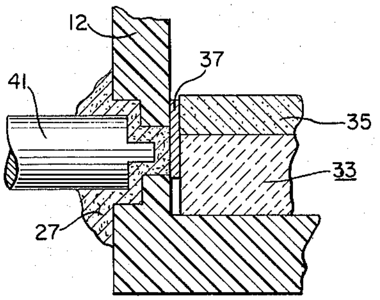
Figure 3A:
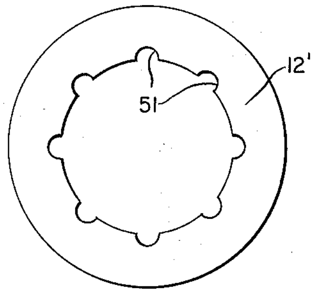
Figure 4A:
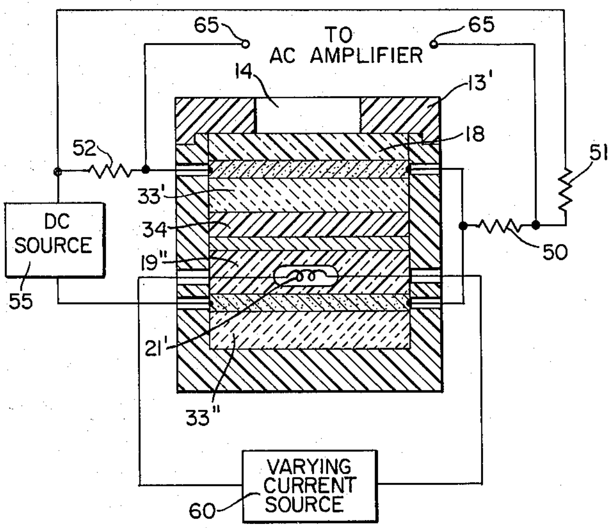
Figure 3B:
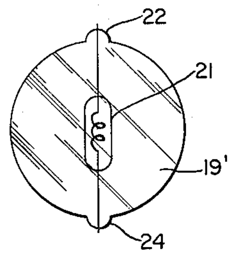
Figure 4B:
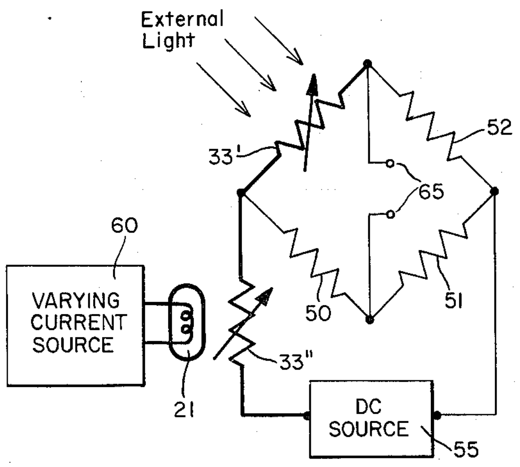
Figure 5A:
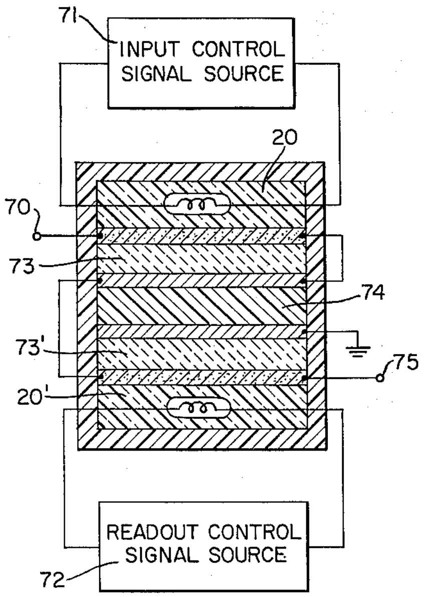
Figure 5B:
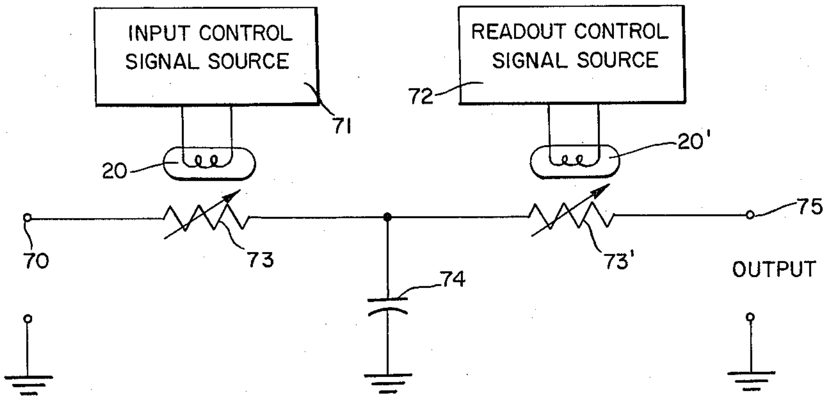

FIG. 2*a* is a sectional view taken along the section line 2*a*—2*a* of FIG. 2;

FIGS. 3*a* and 3*b* show alternative construction of two elements of the invention illustrated in FIG. 2 according to another form of my invention;

FIGS. 4*a* and 4*b* show in sectional and equivalent circuit representations another form that my invention may take; and FIGS. 5*a* and 5*b* show in sectional and equivalent representations still another embodiment of my invention.

Figure 1:
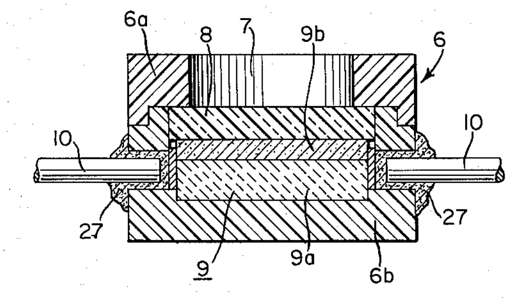
FIG. 1 is a partly sectional side elevation view of a simple light-responsive cell constructed in accordance with one form of my invention.

Referring to FIG. 1 my invention is seen in a simple form as a photocell of novel construction. It includes an essentially cylindrical housing 6 made of a rigid plastic material, for example, consisting of a top portion **6*a* having an aperture 7. The top 6*a* fits over a base portion 6*b* and within the interior space bounded by the housing are a plastic disc-shaped wafer 8 pressed tightly against the lower rim of the aperture 7 and a photoelectric element 9. The wafer 8** must be at least partially light-transmissive and can be, for example, made of the clear flexible plastic material sold under the trademark "Sylgard 182" by the Dow-Corning Corporation.

The photoelectric element 9 includes a disc-shaped wafer **9*a* of a ceramic material on which a photoconductive or other photo-responsive region 9*b* is disposed. The region 9*b* may include cadmium selenide as the active agent to name one typical material. It is seen that the region 9*b* is in intimate contact with the wafer 8. Since the wafer 8 is flexible, it will effectively seal the surface of the region 9*b* from moisture or other impurities. Furthermore, since the wafer 8 is flexible, its pressure against the lower rim of the aperture 7 keeps the interior of the cell free from impurities. The wafer 8, being made of a flexbile, clear, plastic material, also helps to cushion the element 9 from shocks and helps to stabilize its position. The region 9*b* is connected to external leads 10 which pass through apertures 5 in the housing 6, the apertures being sealed by wads 27 of a conductive plastic material such as the conductive silver epoxy formulation "3022" manufactured and sold by Joseph Waldman & Sons of Irvington, New Jersey. This epoxy seal establishes a conductive path between the leads 10 and the region 9*b* as well as providing a firm anchor for the leads 10**.

It may be seen by the construction of this novel cell that fabrication is quite simple. First, the element 9 is inserted into the portion **6*b*, the flexible transparent sealing wafer 8 is inserted on top of the element 9, and the top portion 6*a* is pressed down against the wafer 8 and cemented to the bottom portion 6*b*. The apertures for the leads are then filled with the conductive epoxy material 27 and the leads 10 are inserted through the epoxy until the ends are close to but not necessarily in contact with the element 9**. When the epoxy hardens, a moisture-proof, dust-proof, shock-resistant photocell of great durability is obtained.

Referring to FIG. 2 there is shown a novel light-responsive switch or relay 11 which comprises an essentially light-opaque housing consisting of a cylindrical body portion 12 and top or cap portion 13. The housing may be made of a plastic material such as epoxy or any other desired opaque plastic material. The housing is essentially cylindrical and has drilled on opposite sides thereof two stepped apertures 15 and 16 which are axially aligned with one another. Within the space 17 enclosed by the housing are a disc or wafer like member 19 which incorporates a light source 21. The wafer 19 may be made of the flexible light-transmissive plastic material "Sylgard 182" mentioned previously. The light source 21 may be a "Pinlite" brand miniature glass-enclosed incandescent bulb sold by Kay Electric Company of Pine Brook, New Jersey. Two leads 23 and 25 of the miniature light source 21 extend outside the wafer 19. The external portions of the lead make contact with the wads 27 of a conductive plastic such as the epoxy formulation "3022" previously mentioned. Also embedded in the wads 27 are the ends of terminals 29 and 31. Also within the interior space is a photo-sensitive cell 33 having deposited on a ceramic substrate 39 a photo-sensitive area 35 made of a material such as cadmium-selenide. The photo-sensitive area 35 is connected to two leads, one of which is designated by the numeral 37 as shown in FIG. 2*a*. At right angles to the pair of terminals 29, 31 are two other axially aligned terminals of similar construction, one of which is indicated by the numeral 41. These terminals also are set into apertures similar to the apertures 15 and 16 on opposite sides of the housing 12. Of course, the second set of apertures can be disposed coaxially with one another and parallel to the first set of apertures or in any other desired positional relation thereto.

Wads of a conductive sealant such as the type 3022 referred to above are used to establish contact between the terminal 41 and the lead 37 on one side and the opposite terminal and lead on the other side. For convenience in mounting, the base of the housing 12 may be provided with a male plug 43 which is screwed into a tapped aperture 45.

Since the wafer 19 is made of an elastic material, it may easily be inserted into the space within the housing after a photo-sensitive cell 33 has first been inserted. The wafer 19 must permit at least part of the light from the source 21 to reach the area 35 of the wafer 33. The flexibility of the wafer 19 makes the source 21 quite impervious to shocks and since it does yield somewhat, expansion of the glass envelope of the source 21 will not cause the envelope to break as might be the case if the wafer 19 were constructed of a rigid material. If the wafer 19 is pushed down into the space 17 from above, the ends of the leads 23 and 25 would be bent over somewhat as shown, but this is unimportant since the wads 27 of the conductive sealant make good ohmic contact therewith. Since the epoxy wads are quite rigid when cured, they provide a good foundation in which to embed the terminals 29 and 31 as well as providing a good electrical contact for them. Thus, there need be no soldering between the ends of the leads 23 and 25 and the terminals 29 and 31.

The wafers 19 and 33 may be spaced from one another by appropriate annular or disc-shaped wafer (not shown) of the same material as the wafer 19 or of some other material. To enhance the sensitivity of the cell 39, there may also be provided a metallic, light-reflective disc 47 between the top 13 and the wafer 19.

In order to facilitate the orientation of the component wafers or discs of my novel modular device, the inner wall of the housing 12 in a different form of my invention may contain a number of longitudinal parallel grooves such as the grooves 51 (FIG. 3*a*) formed in the inner wall of the housing 12'. As shown in FIG. 3*b*, each of the component modules of the novel device such as the wafer 19' also has formed thereon one (or more) lateral projecting ridges 22 and 24, for example, which fit in any two (or more) of the grooves 51. It is also possible to provide the wafer 19' with more ridges to facilitate construction of the device. The source 21 need not have its leads pass through the ridges as shown in FIG. 3*b* but can have them oriented at any other angle to engage the proper apertures in the walls of the housing 12'. Conceivably, the construction shown in FIGS. 3*a* and 3*b* could be used to permit the grooves 51 to act as channels for the leads from the various modular wafers out through the base of the device rather than having them come out through transverse apertures in the wall of the housing. Some of the components of the device may not have any leads thereto but can, if desired, be provided with key ridges to help stabilize their position.

The invention may also be embodied in a construction as shown in FIG. 4*a*. Here, the top 13' has an aperture 14 therein through which external light may pass. To seal the interior space 17 against moisture, dust or air, a disc 18 of clear plastic, for example, is disposed in intimate contact with the aperture edges as in the form of the invention shown in FIG. 1. Next to the disc 18 there is disposed a photo-sensitive cell 33'. Directly below the cell 33' is an opaque barrier disc or wafer 34 which prevents light from the compartment on either side of it from getting into the other compartment. Below the wafer 34 is a metallic reflecting member 47' and a wafer 19'' incorporating a light source 21' is disposed next to another photo-sensitive wafer 33'' whose photo-sensitive area faces the wafer 19''. The photo-sensitive wafers 33' and 33'' have a common connection which is connected to resistors 50, 51 and 52 as shown in FIG. 4*a*. The other terminal of wafer 33' is connected to the other lead of resistor 52. A D.C. source 55 is also connected to the junction of resistors 51 and 52 and to one terminal of the photo-sensitive cell 33''. The wafer 19'' is electrically connected across a varying current source 60.

In FIG. 4*b* the equivalent circuit for the device schematically illustrated in FIG. 4*a* is shown, the elements in heavy lines being those located within the device itself. This device can be used, for example, where it is desired to sense changes in light external to the device and convert this into a relatively large modulated A.C. output voltage. The external radiation passes through the aperture 14 and through the transparent wafer 18 on to the photo-sensitive area of the wafer 33' whose resistance is thereby changed. The D.C. source 55 may, in one exemplary arrangement, apply up to about 100 volts across the bridge as shown. The varying current source 60 (which may be an A.C. source) causes the miniautre light bulb 21' to vary in intensity which causes the resistance of the photo-sensitive wafer 33'' to change accordingly. Hence the output is a modulated D.C. signal whose modulation amplitude is a function of the imbalance of the bridge and the voltage supplied by source 55. This signal may be applied via a coupling capacitor to an A.C. amplifier and treated as an A.C. signal, the coupling capacitor functioning to remove the D.C. component. Another form which my invention may take is shown in the device schematically depicted in FIG. 5*a* and whose equivalent circuit is shown in FIG. 5*b*. Two wafers 20 and 20' each containing miniature light sources are respectively coupled to signal source 71 and readout signal source 72. Opposite each of the sources 71 and 72 are located photo-sensitive cells 73 and 73'. The photo-sensitive area of the cell 73 has one terminal connected to an input terminal 70 of a D.C. source and its other terimnal connected to one plate of capacitor 74 which may also be in modular disc or wafer form, for example. The other plate of the capacitor 74 is connected to a common terminal such as ground. The first plate of the capacitor 74 is also in series with the photo-sensitive region of the photocell 73' whose other terminal is connected to an output terminal 75. In certain cases, if the bottom opposed surfaces of cells 73 and 73' were to be coated with a conductive layer and a dielectric disc inserted between them, the separate capacitor 74 could be dispensed with.

When the current through wafer 20 is zero, the resistance of the wafer 73 will be very high but when the current through the wafer 20 is sufficient to cause the bulb embedded therein to produce light, the resistance of the cell 73 drops considerably and the capacitor 74 is charged from the input terminals according to known RC principles. When the input signal from source 71 ceases, the light in wafer 20 will go out and the resistance of the wafer 73 will be very high. The charge on capacitor 74 will be a function of the time that the bulb of wafer 20 was lit and of several other known factors.

If a signal from the read out control signal source 72 is then applied through the bulb within the wafer 20', the resistance of the photo-sensitive cell 73' will be lowered considerably so that there will appear between the output terminal 75 and ground a voltage due to the discharge of the capacitor 74 through the cell 73', the amplitude of the output signal depending upon the amplitude of the signal stored in the capacitor 74 and the time that the wafer 20' is illuminated. Thus my invention can be employed in a memory element as well as a switch or relay.

Of course, the elements of my modular device can be arranged in many different ways and connected in circuit in a great number of configurations to produce various other types of logical elements such as AND, OR, GATE, or mixer circuits.

Still other combinations of modular wafers and similar elements are possible depending upon the desired application. In FIG. 3*a* a clear transparent wafer 18 was used. In addition to using clear wafers, colored filter wafers may be used. Also, disc-like spacer wafers or annular wafers can be employed where necessary. It may also be desirable to use a sealant around the various modular wafers to reduce the amount of air contained in the enclosure and to help seal the components against moisture penetration which may adversely affect some of the components such as the photo-sensitive cell. The photo-sensitive cell, of course, can be of any desired type such as photo-conductive, photo-resistive, or photo-voltaic.

The use of the conducting epoxy cement as the conductive connection between the external terminals and the ends of the leads protruding from the wafers helps to provide structural rigidity and, by virtue of its good heat-conduction characteristics, helps to remove heat from the interior of the device thereby improving the dissipation characteristic of the cell so that it can be used to handle heavier loads, and possible adding to the life of the internal components and enhancing their performance characteristics.

Where a reflective metallic module such as the wafer 47 shown in FIG. 1 is used, it can act as a reflector for the light source, or as a light barrier between various sections of the device (such as the wafer 34 in FIG. 3*a*), or as an electrical shield between or around various internal components of the device.

As an illustration of the miniature size of the switches and relays it may be pointed out that the wafer containing the light source may have a diameter of .196" and a height of .0624." A simple modular device including one wafer containing a light source and another photo-sensitive wafer might have typical dimensions such as .2655" outside diameter. The simple device shown in FIG. 2 may have a volume of .0145 cubic inch and weigh .025 oz. The structure shown in FIG. 4*a* may weigh .039 oz. and have a volume of .0278 cubic inch.

I claim:

1. An electrical device comprising: at least one substantially flat plastic member transmissive of selected radiation, said member incorporating a source of said radiation, at least one photosensitive member having substantially the same general configuration as said plastic member and being positioned in intimate contact therewith, said photosensitive member being responsive to said radiation, a housing enclosing said members which is made of a material that is substantially non-transmissive of said selected radiation, and means for applying electrical potentials to said members.

2. The device according to claim 1 wherein said housing has its inner surfaces constructed to mate with the edges of said members and wherein said potential applying means includes a selected number of apertures in said housing, a selected number of terminals in said apertures whose ends approach selected ones of said members, and a conductive cementitious material disposed to provide a conductive connection between said terminals and said members and to prevent radiation from external sources to which said photosensitive member is sensitive from entering said housing, said cementitious material also extending outwardly of the apertures around said terminals and serving to fix said terminals in position in said apertures.

3. An electrical device comprising: at least one wafer-like flexible plastic member transmissive of selected radiation and having a compliant surface, said member incorporating a source of said radiation, at least one photosensitive member having essentially the same general configuration as said flexible member and having a photosensitive surface area in intimate contact with said compliant surface thereby preventing moisture and undesired impurities from reaching said active area, said photosensitive member being constructed to be responsive to said selected radiation, a rigid housing entirely enclosing said members which is substantially non-transmissive of said selected radiation, the inner surfaces of said housing being constructed substantially to mate with the outer edges of said members, and means for applying electrical potentials to said members through said housing.

4. An electrical device comprising: at least one disc-shaped flexible plastic member transmissive of light, said flexible member incorporating a miniaturized light bulb, a photosensitive member having essentially the same transverse cross-section as said flexible member and having an active area which is responsive to said light, said photosensitive member being pressed tightly against said flexible member to maintain intimate contact with said active area thereby preventing moisture and undesired impurities from reaching said area, a rigid housing into which said members are set which is non-transmissive of said light, said housing having a substantially circular bore whose diameter is substantially the same as the diameters of said members so that said members fit snugly into said housing, and means for applying an electrical potential to said members through said housing.

5. The electrical device according to claim 4 wherein said housing is provided with an aperture, and wherein said flexible member is also in intimate contact with the innermost edge of said aperture thereby sealing the interior of said device.

6. The device according to claim 4 wherein said means for applying an electrical potential includes a selected number of apertures in said housing, said apertures being aligned in coaxial pairs substantially transverse to the longitudinal axis of said housing, a selected number of terminals in said apertures whose inner ends are disposed close to selected ones of said members, and a conductive cementitious material in said apertures disposed in contact with said terminal ends and with said members to provide conductive connections therefor, said material also sealing said apertures around said terminals and serving to fix said terminals in position.

7. The device according to claim 3 wherein said housing is made of a rigid material and has a selected number of longitudinal grooves in it and wherein selected ones of said members have selected lateral projections constructed to engage said grooves upon insertion into said housing.

8. The device according to claim 7 wherein said selected members are constructed to have their leads disposed through said projections and wherein said applying means includes a selected number of apertures disposed in said grooves constructed to be engaged by said projections.

9. An electrical device comprising: a rigid and opaque housing, said housing having an aperture therein through which radiation from an external source can pass, a flexible plastic member transmissive of said radiation within said housing and engaging the inner edges of said aperture under pressure thereby to prevent undesired matter from the external atmosphere from entering said housing, a first photosensitive member within said housing to which an electrical potential is to be applied having an exposed photosensitive area pressed into intimtae contact with the interior surface of said flexible member, a second photosensitive member within said housing to which an electrical potential is to be applied, a source of light to which said second member is responsive mounted within said housing near said second member, means within said housing for sealing said second member and said light source from the rest of the interior of said housing thereby to prevent said external radiation from affecting said second member and light from said source from affecting said first member.

10. An electrical device comprising: a rigid and opaque housing, said housing having a predetermined internal cross-section, said housing having an aperture therein through which radiation from an external source can pass, said housing being divided into at least two compartments by a partition member; a first of said compartments including a flexible plastic member transmissive of selected external radiation, said flexible member being pressed into intimate contact with the inner edge of said aperture to prevent undesired external matter from entering the interior of said housing and further including a photosensitive member to which an electrical potential is to be applied having an active area responsive to said selected radiation, said area being pressed into intimate contact with said flexible member; a second of said compartments including a flexible plastic member in which is embedded a source of selected radiation to which an electrical potential is to be applied and also including a second photosensitive member to which an electrical potential is to be applied, said second member being responsive to radiation from said embedded source; said members in said first and second compartments all having substantially the same transverse cross-sections as the corresponding internal cross-section of said housing whereby they are adapted to fit snugly therein; said device further including means for applying potentials through said housing to said members.

11. The device according to claim 10 wherein said second compartment contains means for reflecting radiation from said embedded source to said second photosensitive member.

12. An electrical device comprising: at least one flexible plastic member transmissive of selected radiation, said member incorporating a source of radiation, at least one photosensitive member having substantially the same general configuration as said plastic member and located in proximity thereto, said photosensitive member being responsive to said radiation, a housing enclosing said members which is substantially non-transmissive of said radiation, and means for applying electrical potentials to said members.

References Cited by the Examiner

UNITED STATES PATENTS

| | | | |
|---|---|---|---|
| 1,334,850 | 3/20 | George et al. | 338—269 |
| 2,222,788 | 11/40 | Touceda et al. | 250—239 X |
| 2,838,683 | 6/58 | Munro | 250—227 |
| 2,839,646 | 6/58 | Hester | 250—211 |
| 2,904,695 | 9/59 | White | 250—239 X |
| 2,967,945 | 1/61 | De Gier | 250—211 X |
| 2,997,596 | 8/61 | Vize | 250—209 |

FOREIGN PATENTS 793,357 4/58 Great Britain. (Corresponding U.S. Patent 2,875,308, 2/24/59).

RALPH G. NILSON, *Primary Examiner.*

WALTER STOLWEIN, *Examiner.*